US009193046B2

(12) United States Patent
Landrum

(10) Patent No.: US 9,193,046 B2
(45) Date of Patent: Nov. 24, 2015

(54) AUTO CYCLE PUMP AND METHOD OF OPERATION

(75) Inventor: Michael T. Landrum, Rockford, IL (US)

(73) Assignee: SPX FLOW, INC., Charlotte, NC (US)

(*) Notice: Subject to any disclaimer, the term of this patent is extended or adjusted under 35 U.S.C. 154(b) by 514 days.

(21) Appl. No.: 13/566,664

(22) Filed: Aug. 3, 2012

(65) Prior Publication Data
US 2014/0033876 A1 Feb. 6, 2014

(51) Int. Cl.
F15B 11/15 (2006.01)
B25B 21/00 (2006.01)
F16K 37/00 (2006.01)
F15B 13/04 (2006.01)

(52) U.S. Cl.
CPC .............. *B25B 21/005* (2013.01); *F15B 11/15* (2013.01); *F16K 37/0041* (2013.01); *F15B 2013/0409* (2013.01); *F15B 2211/632* (2013.01); *F15B 2211/634* (2013.01); *F15B 2211/7725* (2013.01); *Y10T 137/0391* (2015.04); *Y10T 137/7738* (2015.04); *Y10T 137/8242* (2015.04); *Y10T 137/8259* (2015.04); *Y10T 137/85954* (2015.04); *Y10T 137/86019* (2015.04); *Y10T 137/86059* (2015.04)

(58) Field of Classification Search
CPC .............................. F15B 11/15; F16K 37/0041
USPC ........................................................... 60/459
See application file for complete search history.

(56) References Cited

U.S. PATENT DOCUMENTS

| 3,212,523 | A | * | 10/1965 | Martin | 137/596.13 |
| 3,327,079 | A | * | 6/1967 | Widl | 200/82 R |
| 3,578,123 | A | * | 5/1971 | Freeland | 192/131 R |
| 4,213,021 | A | * | 7/1980 | Alexander | 200/81.9 M |
| 4,376,450 | A | * | 3/1983 | Fayfield et al. | 137/554 |
| 5,617,771 | A | * | 4/1997 | Landrum | 91/1 |
| 7,533,690 | B2 | * | 5/2009 | Reinicke et al. | 137/487.5 |
| 8,375,989 | B2 | * | 2/2013 | Schottler | 137/596.18 |
| 8,863,640 | B2 | * | 10/2014 | Hill et al. | 91/1 |
| 2009/0255246 | A1 | * | 10/2009 | Wu et al. | 60/459 |
| 2010/0115937 | A1 | * | 5/2010 | Dybing | 60/445 |

OTHER PUBLICATIONS

International Search Report and the Written Opinion of the International Searching Authority mailed Dec. 11, 2013 for PCT/US2013/052614.

* cited by examiner

*Primary Examiner* — Thomas E Lazo
(74) *Attorney, Agent, or Firm* — Baker & Hostetler LLP

(57) ABSTRACT

A hydraulic flow sensing apparatus is provided. The apparatus includes: a manifold; a hole in the manifold in fluid communication with a fluid pathway; a poppet valve in the hole in the manifold configured to move when fluid in the pathway flows; and a proximity switch configured to detect movement of the poppet valve. A method of operating a hydraulic circuit may also be provided.

19 Claims, 5 Drawing Sheets

AUTO CYCLE PUMP AND METHOD OF OPERATION

FIELD OF THE INVENTION

The present invention relates generally to a hydraulic pump. More particularly, the present invention relates to a hydraulic pump configured to provide hydraulic pressure for a hydraulic tool.

BACKGROUND OF THE INVENTION

In several industries such as the construction industry or industries where pipelines are used to transport fluid pressurized fluids, very large nuts and bolts are used to fasten jointed pipe members together. For example, large pipes are connected by large pipe flanges and pipe, structural members may also be tightened by the use of large nuts and bolts as well as other structural members, wind generator tower sections, utility poles and a myriad of other applications may use very large nuts and bolts.

Large nuts and bolts used in these industrial applications require high amounts of torque to be properly tightened. As result, large amounts of torque is also required to loosen these large fasteners. Because of the high torque requirements needed to tighten or loosen these large fasteners it would be impractical to use mechanical torque wrenches. As such, the industry has turned to the use of hydraulic torque wrenches which are capable of generating thousands of foot-pounds of torque. These torque wrenches may be driven by a hydraulic pump capable of delivering about 10,000 PSI to the hydraulic torque wrench. These torque wrenches often incorporate a double acting hydraulic cylinder to push a rotary ratchet to apply the torque.

A commonly encountered problem with many hydraulic pumps used to drive hydraulic torque wrenches is that a hand pendant is used by the operator to extend and retract the hydraulic cylinder with in the torque wrench. An operator must actuate an actuator on the hand pendant to extend and again actuate the actuator to retract the hydraulic cylinder within the torque wrench. This requires many repeated operations of actuating the actuator for each faster. The operator's hand may become quickly fatigued. This may become a problem particularly in instances where there are many fasteners that need to be tightened or loosened. Furthermore, requiring repeated operations of actuating the actuator on the hand pendant is slow and not efficient.

Accordingly, it is desirable to provide a method and apparatus that allows a fastener to have an appropriate amount of torque applied to it while at the same time not requiring an operator to constantly actuate an actuator in order to provide the appropriate amount of torque. Further, it may be useful to have a pump that will automatically cycle the torque wrench through extending and retracting the hydraulic cylinder contained within the torque wrench while the operator merely actuates a button or other actuator a single time for each faster. It may also be desirable for the pump to not only automatically cycle the wrench to completely tighten or loosen the faster but also shut down when a proper torque is achieved.

SUMMARY OF THE INVENTION

The foregoing needs are met, to a great extent, by some embodiments in accordance with the present invention, wherein in some embodiments a method and/or apparatus is provided that allows a faster to have an appropriate amount of torque applied to it while at the same time not requiring an operator to constantly actuate an actuator in order to provide the appropriate amount of torque. In some embodiments it may be provided to have a pump that will automatically cycle the torque wrench through extending and retracting the hydraulic cylinder contained within the torque wrench while the operator merely actuates a button or other actuator a single time for each faster. In some embodiments it may be provided for the pump to not only automatically cycle the wrench to completely tighten or loosen the faster but also shut down when a proper torque is achieved.

In accordance with one embodiment of the present invention, a hydraulic flow sensing apparatus is provided. The apparatus includes: a manifold; a hole in the manifold in fluid communication with a fluid pathway; a poppet valve in the hole in the manifold configured to move when fluid in the pathway flows; and a proximity switch configured to detect movement of the poppet valve.

In accordance with another embodiment of the present invention, a method of operating a hydraulic circuit may also be provided. The method may include: operating a pump to pressurized fluid in the hydraulic circuit; flowing fluid through the circuit in a first direction; moving a first poppet valve to a first position via the flow in the first flow path; moving the first poppet valve to a second position when no flow in the first flow path is detected by the poppet valve; sending a signal to a microcontroller when the poppet valve moves to the second position; moving a flow reversing valve to a reverse flow in at least part of the circuit when the signal is sent to the microcontroller; and opening a dump valve to provide fluid communication between the circuit and a reservoir when neither the first nor second poppet valve detect flow in either the first or second flow paths for a predetermined amount of time.

In accordance with yet another embodiment of the present invention, a hydraulic flow sensing apparatus is provided. The apparatus may include: a manifold; a hole in the manifold in fluid communication with a fluid pathway; means for moving when sensing hydraulic fluid flow in the hole in the manifold configured to move when fluid in the pathway flows; and means for detecting movement of the means for moving.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
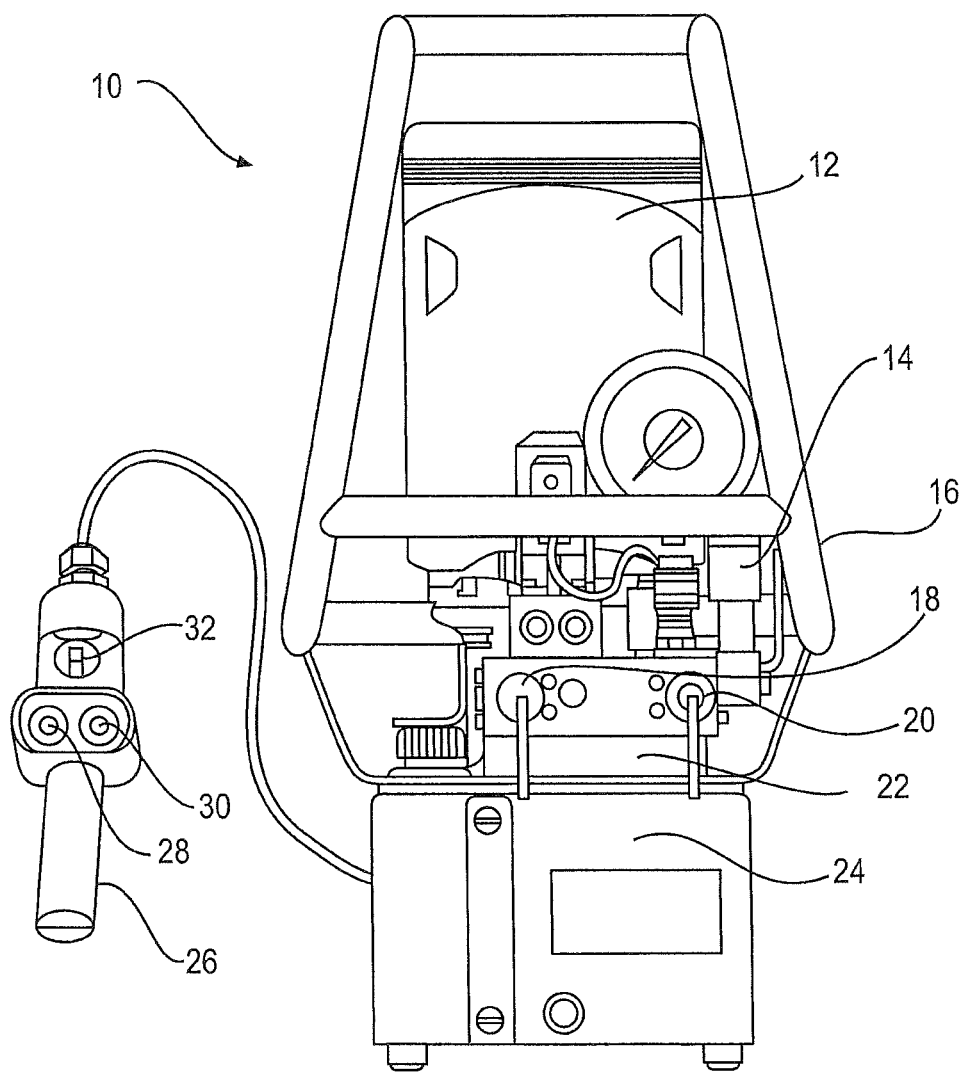
FIG. 1 is a front view of a hydraulic pump in accordance with an embodiment of the invention.

The invention will now be described with reference to the drawing figures, in which like reference numerals refer to like parts throughout. An embodiment in accordance with the present invention and a hydraulic pump that has an automatic mode configured to turn a fastener to a specified amount of torque with only one continuous actuation of an actuator and turn itself off once that torque level has been achieved.

FIG. 1 illustrates a front view of an auto cycle pump 10 in accordance with an embodiment of the invention. The auto cycle pump 10 includes a motor 12 and a pressure regulator 14. The auto cycle pump 10 includes a roll cage 16 which allows the auto cycle pump 10 to be protected in the event that the auto cycle pump 12 is knocked over or is otherwise dealt a blow. The auto cycle pump 10 includes a retract port 18 and an advance port 20 the retract port 18 and advance port 20 carry hydraulic fluid to an external tool. The auto cycle pump 10 includes a flow sensing manifold 22 upon which the retract port 18 and the advance port 20 are mounted.

The auto cycle pump 10 includes a reservoir 24. The reservoir 24 is sometimes referred to as a tank 24. In some embodiments in accordance with the invention, the reservoir 24 contains a hydraulic pump not shown in FIG. 1. The auto cycle pump 10 includes a hand pendant 26. The hand pendant 26 permits an operator to operate the auto cycle pump 10. The hand pendant 26 includes several actuators. For example, the hand pendant 26 may include a manual button or actuator 28 an auto cycle button or actuator 30 and a stop button or actuator 32.

Figure 2:
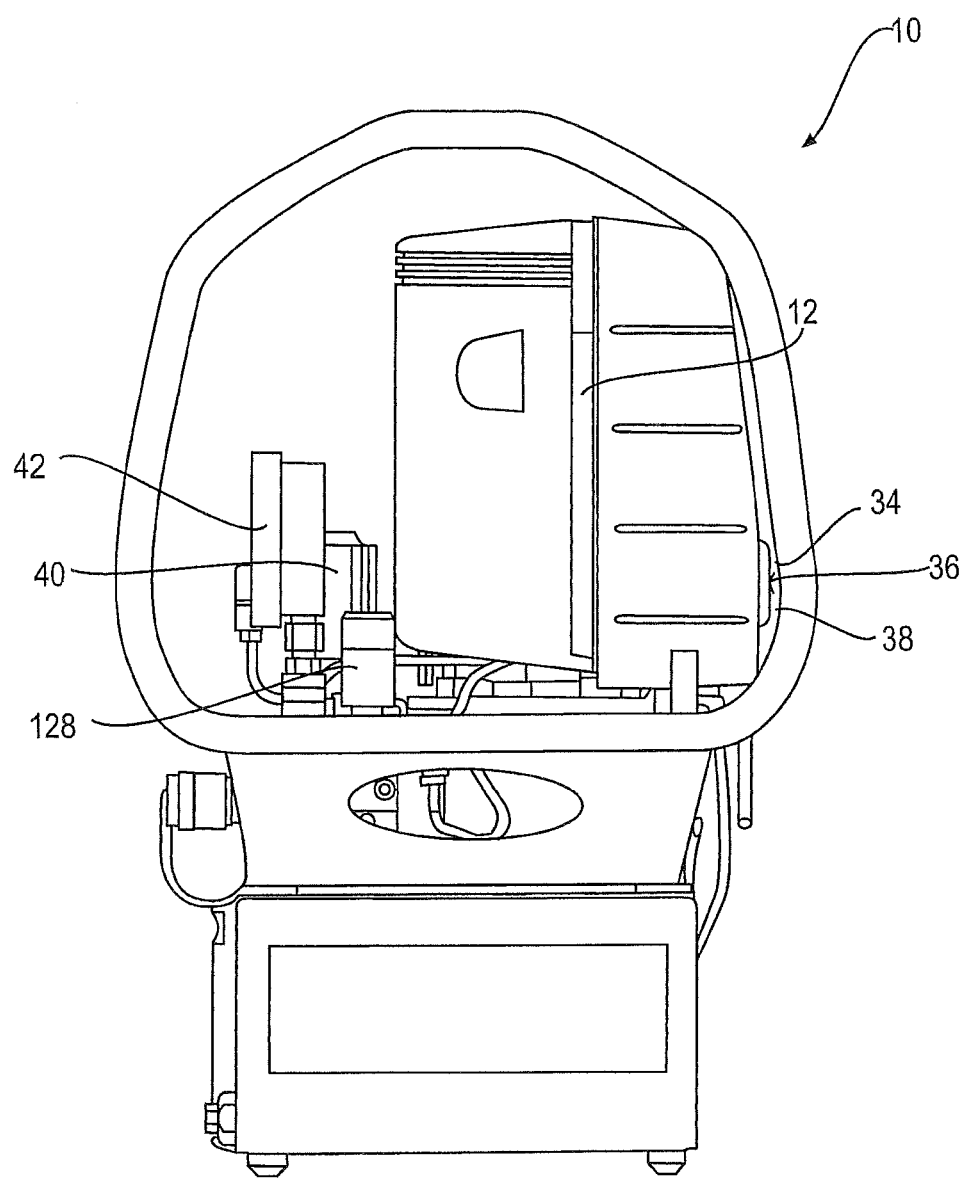
FIG. 2 is a side view of a hydraulic pump in accordance with an embodiment of the invention.

FIG. 2 illustrates a side view of the auto cycle pump 10. As seen in FIG. 2, the cycle pump 10 includes a motor 12 and a power on button 34 which allows an operator to turn the auto cycle pump 10 on or off. The auto cycle pump 10 also includes a power on indicator 36. In some embodiments, the power on indicator 36 may be a light that illuminates when the auto cycle pump 10 has been turned on by the power on button 34. The auto cycle pump 10 may also include a power off button 38 which allows an operator to turn off the auto cycle pump 10 by actuating the power button 38. The auto cycle pump 10 also may include a directional valve 40 and a pressure gauge 42 and pressure regulator valve 128. The auto cycle pump 10 may also include various other features and components which are well known in the art and will not be explained here and in detail.

Figure 3:
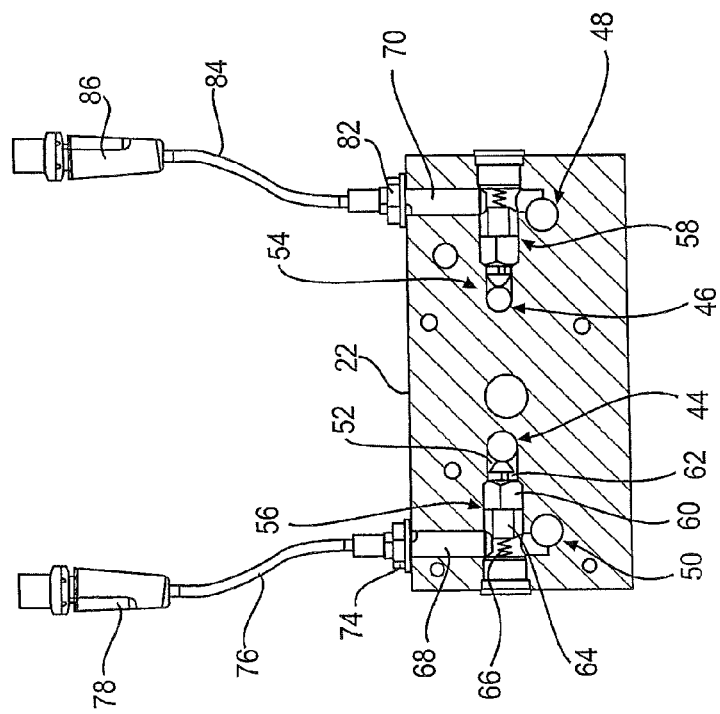
FIG. 3 is a cross-sectional view of a flow sensing manifold in accordance with an embodiment of the invention.

FIG. 3 illustrates a cross-sectional view of the flow sensing manifold 22 shown in both FIGS. 1 and 2. The flow sensing manifold 22 includes and inlet return flow ports or pathways 44 and 46. The flow sensing manifold 22 also includes oil return ports or pathways 48 and 50. In some embodiments in accordance with invention, the oil return pathways 48 and 50 allow hydraulic oil or other hydraulic fluid to flow back to the reservoir 24 (shown in FIGS. 1 and 2). The flow sensing manifold 22 also includes two bores 52 and 54 while these bores 52 and 54 referred to as bores they do not necessarily need to be bored into the flow sensing manifold 22. Other means of making suitable holes can also be used in accordance with some embodiments of the invention.

A poppet valve 56 is located in bore 52 and a second poppet valve 58 is located in bore 54. The first poppet valve 56 includes a square section or body 60, a nose 62, and a tail section 64. A spring 66 urges the poppet valve 56 to a position to the right as shown in FIG. 3. A proximity switch 68 is located proximal to the poppet valve 56 and is configured to sense the location of the poppet valve 56. Specifically, the proximity switch 68 configured to sense the location of the tail 64 of the poppet valve 56. A second proximity switch 70 is located proximal to the second poppet valve 58. The second poppet valve 58 contains similar features as set forth above with respect to the first poppet valve 56 and will not be further described herein. Furthermore, one of ordinary skill in the art after reading this disclosure will understand that the proximity switch 70 is configured to sense the location of at least part of the poppet valve 58.

The poppet valves 56 and 58 are configured to fit tightly with in the bores 52 and 54 and are oriented so that they can sense hydraulic fluid flow within the inlet return flow ports or pathways 44 and 46 respectively. Because of the tight fit between the poppet valves 56 and 58 and the bores 52 and 54, a relatively low amount of flow can be sensed by the poppet valves 56 and 58. In particular, the nose of the poppet valve 62 and will push the poppet valves 56 and 58 back against their respective spring 66 when the poppet valves 56 and 58 are pushed back against their springs 66, the proximity switches 68 and 70 will detect the presence of the poppet valves 56 and 58. Thus, flow with in either of the two inlet return flow pathways 44 and 46 can be sensed by the proximity switches 68 and 70 via the poppet valves 56 and 58.

The proximity switch 68 is attached to the flow sensing manifold 22 via a connecting nut 74. The proximity switch 68 is connected to a cable 76 that is terminated with a plug 78. The plug 78 can allow signals from the proximity switch 68 to be inputted into an electronic circuit. In some embodiments of the invention, the signals will be inputted into a microcontroller which will be described further below. The proximity switch 70 is configured similarly to proximity switch 68. As shown, the proximity switch 70 is connected to the flow sensing manifold 22 via a connecting nut 82. The proximity switch 70 is connected to a cable 84 terminated by a plug 86. Similar to as discussed above with respect to proximity switch 68, the proximity switch 70 can also have its input sent to a microcontroller or any other desired electronic circuit.

Figure 4:
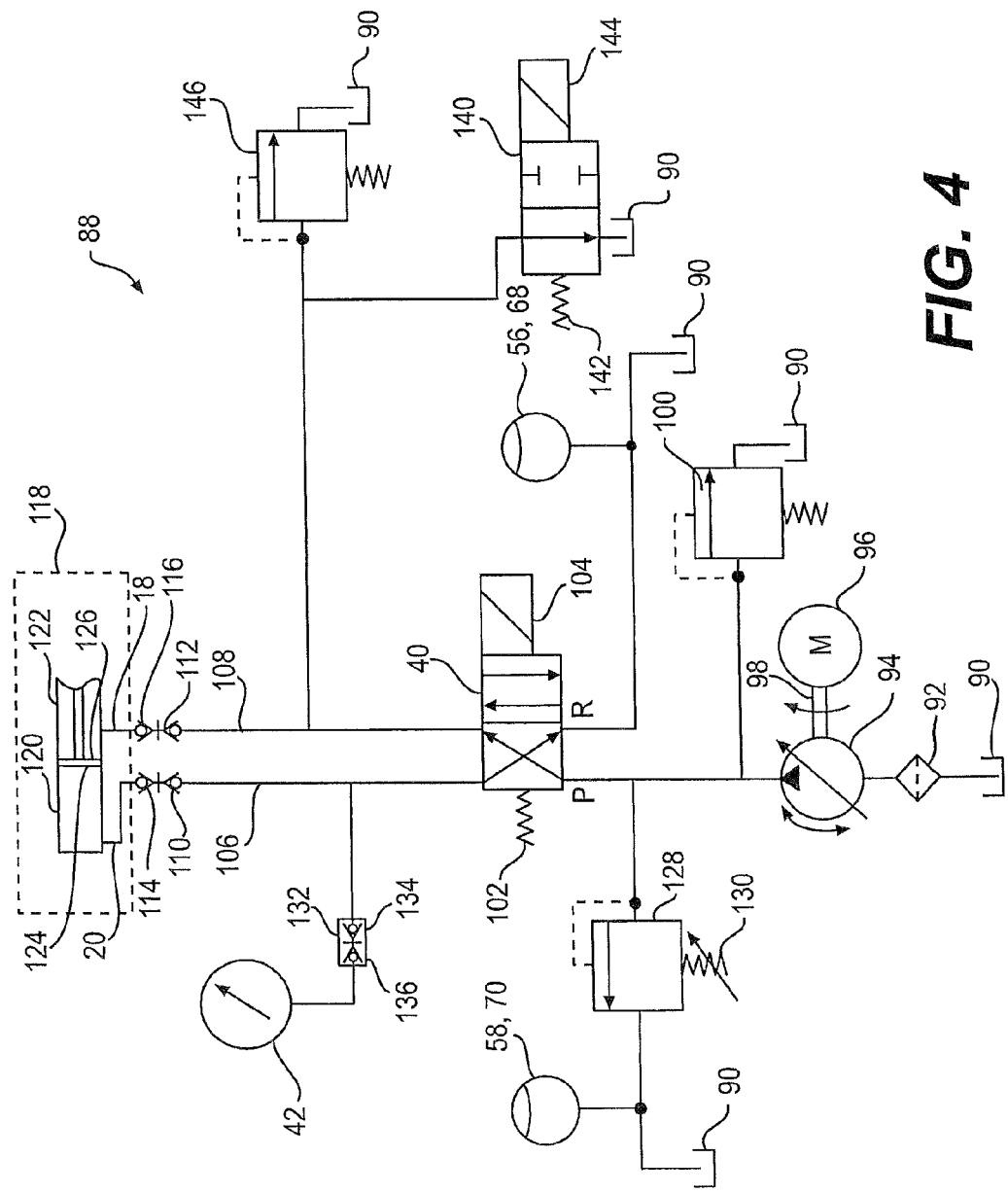
FIG. 4 is a schematic diagram of a hydraulic circuit in accordance with an embodiment of the invention.

FIG. 4 illustrates a hydraulic circuit 88 in accordance with some embodiments of the invention. The hydraulic circuit 88 is a schematic representation of the hydraulic configuration used in the auto cycle pump 10. The hydraulic circuit 88 includes a reservoir 90. The reservoir 90 may also be referred to as a tank 90. When hydraulic fluid or oil is drawn up from the reservoir 90 it passes through a filter 92. The hydraulic fluid is drawn up from the reservoir 90 due to pressure (or suction) generated by a pump 94. The pump 94 is operated by a motor 96 the motor 96 is connected to the pump 94 via a shaft 98. The motor 96 may receive power from a variety of ways such as but not limited to compressed air, electricity, burning of a fossil fuels or any other suitable source of power.

The hydraulic circuit 88 may include a system relief valve 100 which provides a pathway for hydraulic fluid coming from the pump 94 to reenter the reservoir 90 if a pressure reaches undesirable level. However the pressure relief valve 100 is normally in the position as shown in FIG. 4 and does not provide a pathway back to the hydraulic reservoir 90.

Fluid coming from the pump 94 flows to the directional valve 40. The directional valve 40 includes a spring 102 and a solenoid 104. The spring 102 biases the directional valve 40 to the right as shown in FIGS. In the biased position, the fluid coming from the pump 94 is transferred not to the advance pathway 106 but rather to the retract pathway 108. The electronic solenoid 104, when energized, will cause the directional valve 40 to shift allowing hydraulic fluid coming from the pump 94 to flow through the advance pathway 106 and allow fluid coming back from the retract pathway 108 to flow back to the reservoir 90 via the flow sensor 56, 68.

The hydraulic circuit 88 provides connectors 110 and 112 to connect to connectors 114 and 116 on an external device 118. The connectors 110, 112, 114, and 116 include check valves. The connectors 110, 112, 114 and 116 may be quick connectors. In some embodiments in accordance with the invention the external device or tool 118 is a hydraulic wrench. The hydraulic wrench 118 includes a hydraulic cylinder 120 which contains a dual action hydraulic piston 122. The dual action hydraulic piston 122 includes a front face 124 and a rear face 126. When fluid flows through the advance pathway 106 the hydraulic fluid acts upon the front surface 124 of the hydraulic piston 122 causing the hydraulic system piston 122 to advance out of the hydraulic cylinder 120.

When the piston 122 is moved to its extreme position out of the cylinder 120 flow through the hydraulic circuit will stop this will cause the microcontroller to de-energize the solenoid 104 associated with the directional valve 40. The directional valve 40 will then switch the flow from the pump 94 to the retract pathway 108 this will allow fluid to flow through the connectors 112 116 into the cylinder 120 and act on the rear side 126 of the piston 122 causing the piston 122 two move into the cylinder 120. This movement will again cause fluid to move through the circuit 88 until the piston 122 moves to the end of its stroke the piston 122. Once inside the cylinder 120 the piston 122 will stop. When this lack of flow is sensed, the controller will energize the solenoid 104 associated with the directional valve 40 causing the directional valve 40 to move to the left to once again cause flow from the pump 94 to move through the advance pathway 106 into the cylinder 122 act upon the front face will 124 of the piston 122.

If, for a set amount of time, no flow is detected in the circuit 88 by either flow sensor assemblies 58, 70 or 56, 68, a solenoid 144 associated with a dump valve 140 may be de-energized allowing the spring 142 to move dump valve 140 to the right in FIG. 4 allowing the system to move hydraulic fluid into the reservoir 90. In some embodiments in accordance of the invention, the set amount time is 5 seconds. Other amounts of time and also be set by a user. If the dump valve 140 is de-energized for a set length of time, the motor 96 and pump 94 will cease operation as the controller will know that the tool 118 has stalled. In some embodiments, this set length of time is 5 seconds. An example of the tool stalling will be a hydraulic wrench fully turning a nut and unable to turn the nut further.

The flow of fluid through the system 88 can be monitored by the user by viewing the pressure gauge 42 which is connected by the connection 132 including check valves 134, 136. Optionally, the connection 132 is a quick connect which allows a user to swap out different instruments or pressure gauges 42. If too much pressure builds up in in retract pathway 108 a relief valve 146 will move in to an open position allowing flow to move into the reservoir 90. A stalled tool 118 may cause such a build up of pressure. In some embodiments of the invention, a maximum permissible pressure may be 1500 PSI. Other embodiments may have different maximum pressures or may trigger the movement of the relief valve 146 at different pressures.

In some embodiments in accordance with the invention, a maximum amount of desired torque may be set and associated with a pressure regulator valve 128. The pressure regulator valve 128 may have a spring 130 biasing the pressure regulator valve 128 in a certain position once a desired torque level is achieved. The pressure regulator valve 128 will move against the force of the spring 130 to an open position allowing the hydraulic circuit 88 to move fluid into the reservoir 90 flow into the reservoir 90 will be detected by the flow sensor assembly 58, 70 which will indicate to the controller that a desired torque is achieved. Once it is been indicated that desired torque is achieved the fluid will move through the pressure regulator valve 128 and not through the remainder of the circuit. If no flowing detected by flow sensor 56, 68 or flow is sensed by flow sensor 58, 70 for a set amount of time solenoid 144 associated with a dump valve 140 may be de-energized allowing the spring 142 to move dump valve 140 to the right in FIG. 4 allowing the system to move hydraulic fluid into the reservoir 90. If, for a set amount of time, neither button 30 or button 28 in FIG. 5 are depressed the motor 96 and pump 94 will be shut down by the controller.

Figure 5:
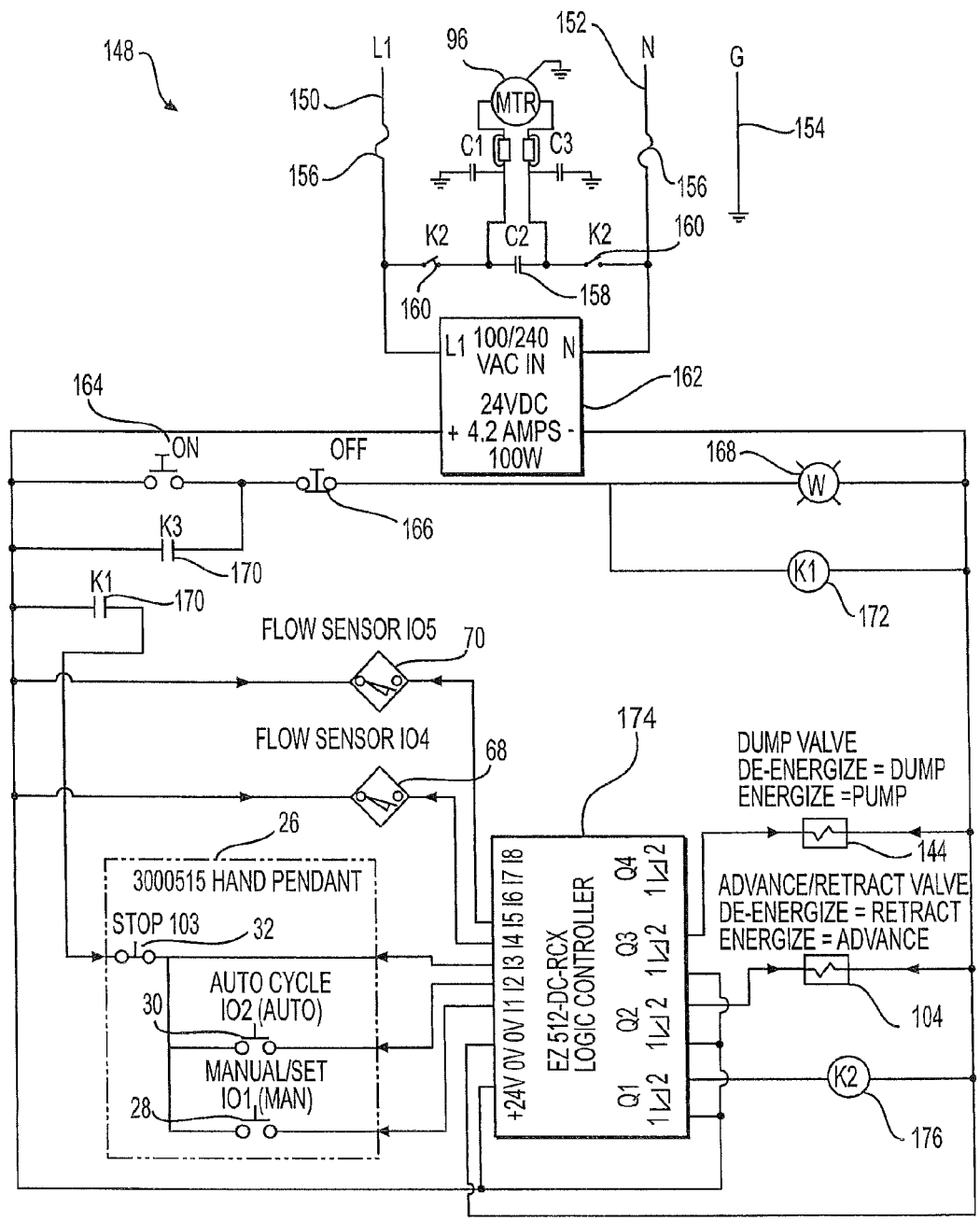
FIG. 5 is a schematic diagram of an electrical circuit in accordance with some embodiments of the invention.

FIG. 5 is illustrates an electrical schematic diagram 148 in accordance with an embodiment of the invention. The schematic diagram 148 illustrates the motor 96 electrically connected via relays 160 to line in 150 and neutral 152 both the line in and 150 neutral lines 152 may contain fuses 156. A ground line 154 is also used. The line in 150 and neutral 152 flow into a power source 162. The power source 162 may be connected to an on switch 164 and an off switch 166. An indicator light 168 may be present to illustrate that the on switch 164 is set in the on position. Contacts 170 may also be present and are shut and/or controlled by the relay 172. The flow sensors 68 and 70 which are the proximity switches are connected to the controller 174 and input an on-off signal into the controller 174. In other embodiments in accordance with the invention the flow sensors 60 and 70 may provide additional signals rather than a simple on-off signal.

The hand pendant 26 is also operatively connected to the microcontroller 174. The hand pendant 26 may have a stop actuator 32, an auto cycle actuator 30 and, in some embodiments, a manual actuator 28 which allows an operator to operate the auto cycle pump 10 in a traditional manual manner. The actuators 28, 30 and 32 connected to the microcontroller 174. The stop actuator 32 allows an operator to stop the action of the pump 94. The auto cycle actuator 30 allows the pump 94 to operate in the automatic cycle described herein. Outputs from the logic controller or microcontroller 174 can energize or de-energize solenoids associated with the various valves. The relay 176 is also controlled by the controller 174. The relay 176 controls the contacts 160 and if either of the two contacts 160 are in an open position then the motor 96 will either shut down or not turn on.

The operation of the auto cycle pump 10 will now be described. After the operator has attached the tool 118 such as a hydraulic wrench and set it in a desired condition, the operator can depress and hold down the auto cycle button 30 on the hand pendant 26. The logic controller 174 sends a signal to the directional valve 40 and to the dump valve 140. These two valves 40 and 140 are energized and move to a position against their springs 102 and 142 respectively. The dump valve 140 shifts blocking flow from the reservoir 90 through the dump valve 140. The directional valve 40 shifts directing flow from the pump 94 to the advanced pathway 106 to the tool 118. The piston 122 within the tool 118 begins to extend. The return fluid from the tool 118 is returned through the retract pathway 108. From the retract pathway 108 the hydraulic fluid is directed through poppet valve 56 of the flow sensing manifold 22 (see FIG. 3). The poppet valve 56 moves to the left and is sensed by the proximity switch 68. The proximity switch 68 sends a signal to the logic controller 174 that the tool 118 is moving or in other words that there is flow through the hydraulic circuit 68. The logic controller 174 starts monitoring the time that flow occurs. When the piston 124 in the tool 118 meets the end of its stroke, hydraulic flow through the circuit 88 stops. The controller 174 de-energize the valve 40 and the poppet valve 56 moves back to the right due to the force of the spring 66.

The proximity switch 68 may provide a signal to the logic controller 174 indicating that there is no flow through the hydraulic circuit 88. In some embodiments in accordance with the invention, this signal is actually a lack of signal as the proximity switch 68 opens and stops providing a signal to the logic controller 174. The logic controller 174 stores the time value measured from when the proximity switch 68 indicates no flow through the hydraulic circuit 88. The logic controller 174 removes the signal to the solenoid 104 in the directional valve 40 causing the directional valve 40 to shift directing flow from the pump 94 to the retracting pathway 108 of the tool 118. The piston 124 in the tool 118 begins to retract. The return fluid from the tool 118 is returned through the extend pathway 106 from the extending pathway 106 the fluid is directed through the poppet valve 56 of the flow sensing manifold 22.

The poppet valve 56 moves to the left and is sensed by the proximity switch 68. Proximity switch 68 sends a signal to the logic controller that the tool has moved or in other words that flow is occurring through the hydraulic circuit 88. The logic controller 174 starts to monitor the time where flow is occurring.

When the piston 124 in the tool 118 meets the end of its stroke the hydraulic flow stops. The poppet valve 56 moves back to the right due the force of the spring 66 as the flow of hydraulic fluid no longer acts on the poppet valve 56. The proximity switch 68 removes the signal from the logic controller 174 or in other words indicates to the logic controller 174 is that there is no flow through the hydraulic circuit 88. The logic controller 174 records the time value of how much time passes where there was flow through the circuit 88. The sequence stated above is repeated until the preset pressure is met. The logic controller updates the cycle time values for each cycle. In this way, false signals may be ignored no special settings are needed when changing from small to large tools or short to long hoses connecting the tools 118 to the auto cycle pump 10.

When a preset pressure has been met, flow is directed from the pump 94 through the pressure regulator 128. Flow is then directed from the pressure regulator 128 through a poppet valve 58 in the flow sensing manifold 22. The poppet valve 58 moves to the right and the proximity switch 70 sends a signal to the logic controller 174. The logic controller senses that there is a signal coming from the proximity switch 70 and checks the status of proximity switch 68 to ensure the hydraulic piston 122 in the tool 118 has stopped moving thus stopping flow through the hydraulic circuit 88.

Once the logic controller 174 has determined that there has been no flow through the circuit 88 for a predetermined length of time such as for example 5 seconds, the logic controller 174 will remove the signal from the solenoid 104 in the directional valve 40, and in the solenoid 144 in the dump valve 140 causing the directional valve 40 to move to the left. As result of the force of the spring 142 the dump valve 140 also moves to the left. Thus the directional valve 40 shifts to the retract pathway 108 and the dump valve 140 directs hydraulic fluid to the reservoir 90. After being in this position for about 5 seconds the controller 174 will cause the motor 96 to shut off.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A hydraulic flow sensing apparatus comprising:
a manifold;
a hole in the manifold in fluid communication with a fluid pathway;
a poppet valve in the hole in the manifold configured to move when fluid in the pathway flows;
a proximity switch configured to detect movement of the poppet valve, wherein the manifold, hole, poppet valve and proximity switch forming a hydraulic circuit; and
a directional control valve in fluid communication with the hydraulic circuit and operatively connected to a microcontroller.

2. The hydraulic flow sensing apparatus of claim 1, wherein the poppet valve and the hole are dimensioned to have the poppet valve tightly fit in the hole as to approximately form a seal.

3. The hydraulic flow sensing apparatus of claim 1, further comprising a microcontroller operatively connected to the proximity switch.

4. The hydraulic flow sensing apparatus of claim 1, further comprising a second poppet valve located in a second hole in the manifold and a second proximity switch configured to detect movement of the second poppet valve.

5. The hydraulic flow sensing apparatus of claim 1, further comprising a hydraulic pump in fluid communication with the fluid pathway and configured to pressurize the fluid in the fluid pathway.

6. A hydraulic flow sensing apparatus comprising:
a manifold;
a hole in the manifold in fluid communication with a fluid pathway;
a poppet valve in the hole in the manifold configured to move when fluid in the pathway flows;
a proximity switch configured to detect movement of the poppet valve;
a second poppet valve located in a second hole in the manifold and a second proximity switch configured to detect movement of the second poppet valve;
a microcontroller operatively connected to the proximity switches;
hydraulic pump in fluid communication with the fluid pathway and configured to pressurize the fluid in the fluid pathway, the hydraulic pump operatively connected to the microcontroller;
a fluid reservoir;
a second fluid pathway in fluid communication with the pump, the first fluid pathway, the fluid reservoir, and the poppet valves as to create a hydraulic circuit; and
a directional control valve in fluid communication with the hydraulic circuit and operatively connected to the microcontroller.

7. The hydraulic flow sensing apparatus of claim 6, wherein the microcontroller is configured to control the directional control valve based on signals received from the proximity switches.

8. The hydraulic flow sensing apparatus of claim 7, further comprising hydraulic connectors configured to allow a hydraulic tool to be connected to the first and second flow paths.

9. The hydraulic flow sensing apparatus of claim 8, wherein the directional control valve is configured to change the direction of flow with in at least part of the first and second fluid pathways.

10. The hydraulic flow sensing apparatus of claim 9, or in the proximity switches provide a signal to the microcontroller indicating that the poppet valves either in a first or second position; and the microcontroller measures amount of time the proximity switch indicates that a poppet valves is in one of the positions.

11. The hydraulic flow sensing apparatus of claim 10, wherein the microcontroller is configured to store the measured amount of time.

12. The hydraulic flow sensing apparatus of claim 9, further comprising a relief valve operatively connected to the hydraulic circuit.

13. The hydraulic flow sensing apparatus of claim 12, wherein the relief valve is configured to move to a pressure relieving position when a pressure within the hydraulic circuit is at or above about 1,500 psi.

14. The hydraulic flow sensing apparatus of claim 9, further comprising a hand pendant having at least one of the following actuators: a stop actuator, an automatic actuator, and a manual actuator.

15. The hydraulic flow sensing apparatus of claim 14, wherein the microcontroller is configured to operate the pump until the proximity switches provide a signal to the microcontroller indicative of no fluid flowing through the hydraulic circuit for an amount of time.

16. The hydraulic flow sensing apparatus of claim 14, wherein the microcontroller is configured to operate the pump to provide pressure to the hydraulic circuit while at least one of either the automatic actuator and the manual actuator is actuated until the microcontroller receives signals from the proximity switches indicating that no flow has occurred through the hydraulic circuit for a length of time.

17. The hydraulic flow sensing apparatus of claim 9, further comprising at least one of the following valves: pressure regulator valve in fluid communication with the hydraulic circuit wherein the pressure regulator valve may be adjusted by a user to move to an open position when a pressure in the hydraulic circuit is at a set pressure and a dump valve in fluid communication with the hydraulic circuit defaulted to a dump position to allow fluid communication with the reservoir and configured to move to a position blocking fluid communication with tween the hydraulic circuit and the reservoir when the dump valve is energized as controlled by the microcontroller.

18. A method of operating a hydraulic circuit comprising:
   operating a pump to pressurized fluid in the hydraulic circuit;
   flowing fluid through the circuit in a first direction;
   moving a first poppet valve to a first position via the flow in the first flow path;
   moving the first poppet valve to a second position when no flow in the first flow path is detected by the poppet valve;
   sending a signal to a microcontroller when the poppet valve moves to the second position;
   moving a flow reversing valve to a reverse flow in at least part of the circuit when the signal is sent to the microcontroller; and
   opening a dump valve to provide fluid communication between the circuit and a reservoir when neither the first nor second poppet valve detect flow in either the first or second flow paths for a predetermined amount of time.

19. A hydraulic flow sensing apparatus comprising:
   a manifold;
   a hole in the manifold in fluid communication with a fluid pathway;
   means for moving when sensing hydraulic fluid flow in the hole in the manifold configured to move when fluid in the pathway flows;
   means for detecting movement of the means for moving wherein the manifold, the hole, the means for moving and the means for detecting create hydraulic circuit; and
   a directional control valve in fluid communication with the hydraulic circuit and operatively connected to a microcontroller.

* * * * *